Figure 1:
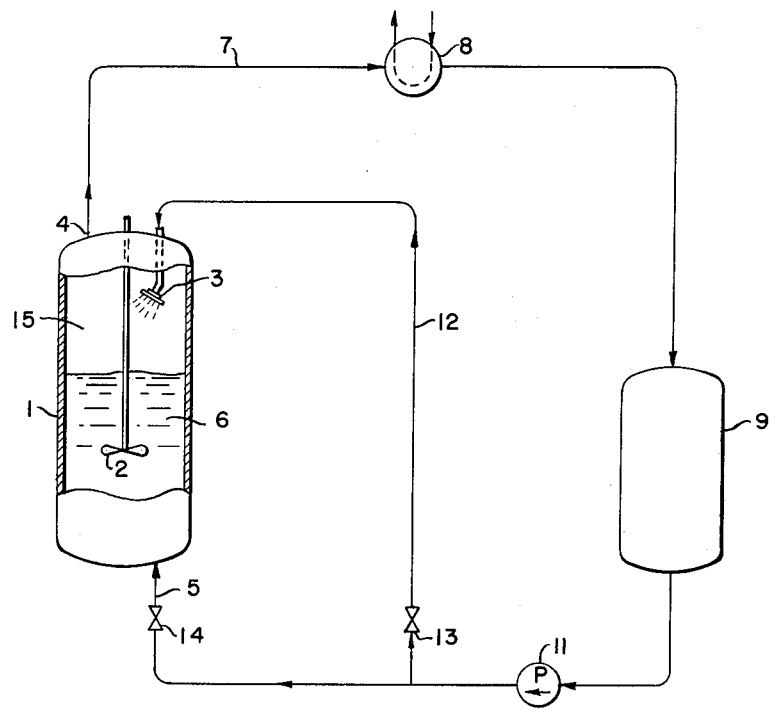

INVENTORS:
JOSEPH M. KUNKEL, JR.
CHARLES R. GREENE
BY: *Harold Shain*
THEIR ATTORNEY

United States Patent Office 3,062,796
Patented Nov. 6, 1962

3,062,796
PRODUCTION OF SYNTHETIC ELASTOMERS
Charles Richard Greene, Rolling Hills, and Joseph Mc-Clintock Kunkel, Jr.-II, Manhattan Beach, Calif., assignors to Shell Oil Company, New York, N.Y., a corporation of Delaware
Filed May 11, 1959, Ser. No. 812,365
4 Claims. (Cl. 260—83.2)

This invention relates to improvements in the production of synthetic elastomers. More particularly it relates to the production of synthetic elastomers in hydrocarbon solutions.

It is known that useful elastomers may be produced from conjugated dienes wherein the elastomers have a high content of the cis-1,4-addition product. The more useful of the cis-1,4-addition products are those prepared from isoprene and butadiene as they have properties that make them particularly suitable for the manufacture of automobile and truck tires and other applications where natural rubber is used. The prior art directed to the polymerization of conjugated dienes to produce cis-1,4-addition products is well known and will not be described in great detail here. It is sufficient to mention that cis-1,4-polyisoprene may be produced by polymerizing isoprene with any of a large variety of hydrocarbyl lithium catalyst. Particularly preferred are the alkyl lithiums as n-butyl lithium, amyl lithium and other normal alkyl lithiums having from 2 to 10 carbon atoms. Such polymerizations are conducted at temperatures ranging from about 25° C. to about 100° C. at ambient pressures. The quantity of catalyst employed may be as low as .03 millimole per mole of isoprene and may be as high as 2 millimoles per mole of isoprene.

The cis-1,4-polybutadiene is best prepared with a catalyst that is the reaction product of a transition metal compound, particularly halides, of a group IV to VIII metal and a strong reducing agent. The reducing agent may be, for example, a metal compound, particularly organo-metallics, of a group I–III metal. Of the numerous reducing agents that may be employed organo-aluminum compounds are favored and are most often described as being useful to produce the polybutadiene having a high content of the cis-1,4-addition product. Fairly representative catalyst compositions for this purpose include the following reaction products:

| | |
|---|---|
| $TiCl_3$—$AlEt_2Cl$ | $CoCl_2$—$AlEt_2Br$ |
| $ZrCl_3$—$AlEt_3$ | $CoCl_2$—$AlEt_3$ |
| $TiCl_3$—$AlEt_3$ | $CoCl_2$—$AlBu_3$ |
| $TiCl_3$—$ZnEt_2$ | $ZrBr_2$—$AlBu_2Cl$ |
| $TiCl_4$—$AlBu_2Cl$ | $NiCl_2$—$AlCl_3$—$AlEt_2Cl$ |

Still many other combinations are known for the formation of cis-1,4-polybutadiene but it may be stated that transition metal halides of group IV, particularly of titanium, are preferred for use with organo-aluminum compounds. As in the case of isoprene, the polymerization temperature ranging from about 25° C. to about 100° C. at ambient pressure and the mole ratios are such that the metal halide is present in molar excess of the organo-metallic compound.

Another class of highly useful elastomers are the copolymers of ethylene and propylene which are produced by polymerizing a mixture of the monomers with a catalyst comprising the reaction product of, for example, vanadium oxychloride and a reducing agent of the type previously described.

The elastomers are produced under conditions that exclude atmospheric impurities particularly oxygen and water. Additionally, impurities as sulfur, sulfur-containing compounds, oxygen, and the like are also to be excluded if a polymer is to be obtained that falls within the useful rubber range. The polymerizations are conducted in the presence of liquid inert diluents as isopentane, hexane, gasoline, benzene, toluene and the like and as the polymerization proceeds the elastomer forms and remains in solution until it is to be recovered. One of the most difficult problems in the production of synthetic elastomers of the type previously described is that of maintaining temperature control while avoiding internal fouling of the reactor. The problem, in essence, arises because the polymerizations are exothermic and produce a product that has a substantial degree of tackiness. If conventional internal cooling is employed, the temperature differentials at the interface of the elastomer solution and the cooling surface may cause solid elastomer to adhere to the cooling surface and thus foul the reactor and reduce considerably the cooling effect of internal cooling means. As a result, cooling of the exothermic reaction may be accomplished conveniently by vaporization of the solvent. As it happens, the polymerization is accompanied by foaming at the early stages of the polymerization while the rate of polymerization is relatively fast. The use of conventional foam breaking techniques, as the use of antifoaming compounds, are not suitable for the preparation of synthetic elastomers in hydrocarbon solutions and the present invention solves the foaming problem mentioned above while also providing means for cooling the polymerizing solution.

It is an object of this invention to provide improved processes for the production of synthetic elastomers in hydrocarbon solutions thereof. It is another object of this invention to provide improvements in such processes wherein cooling is accomplished by evaporation of the solvent. More particularly, it is an object of the invention to produce synthetic elastomers in hydrocarbon solutions thereof by evaporative cooling while eliminating the problem of foaming which occurs during such cooling. Other objects will become apparent as the description of the invention proceeds.

These and other objects are accomplished in the processes for the production of synthetic elastomers in hydrocarbon solvents by the improvements comprising cooling the elastomer solution during polymerization by refluxing the solvent, condensing and accumulating the evaporated solvent and thereafter recirculating the accumulated solvent by spraying said solvent in the vapor space of the polymerization vessel. The spray will function to break-up the foam, cool the polymerizing solution and return solvent to the reactor. In actual practice, foaming occurs only for a short period of time and while the rate of polymerization is relatively fast. As polymerization continues the elastomer solution becomes increasingly viscous and after a while there is no foaming. When that point is reached, recirculating solvent should be returned into the elastomer solution in order to achieve suitable mixing as solvent that is applied to the surface of the elastomer solution does not aid in the thinning and mixing of the solution.

FIGURE 1 is a schematic drawing of the inventive processes of this invention. It is to be noted firstly that the present invention is not particularly concerned with specific processes for carrying out the actual polymerization whereby hydrocarbon solutions of synthetic elastomers are produced and accordingly the drawing does not show features of the process relating to feed and catalyst inlet, and outlets for recovery of the elastomer solution and other features which form no part of this invention.

Referring to the drawing, the polymerization vessel 1 is equipped with an agitator 2, a spray head 3 in the vapor space of the vessel 1, an outlet 4 for the hydrocarbon vapors and an inlet 5 for recirculating hydrocarbon solvent. The polymerization being at elevated temperatures causes the solvent to vaporize and these vapors leave the vessel 1 through the vent 4. The vaporizing solvent causes cooling of the solution 6 and added cooling may be accomplished by recirculating solvent through line 5 and/or the spray head 3.

In the case of those polymerizations where higher boiling solvents are used, as in the case of the polymerization of butadiene with benzene as the solvent, it is helpful to withdraw the solvent vapors with the aid of a vacuum pump (not shown) in line 7. Adequate cooling may be afforded without such auxiliary apparatus as will be described hereinafter.

The vapors coming overhead through lines 4 and 7 are condensed in the condenser 8 and the liquid hydrocarbon is then collected in the accumulator 9. The condenser 8 and the accumulator 9 may be of any conventional design and construction. The accumulator 9 may be equipped with heating or cooling means (not shown) whereby the temperature of the collected solvent may be regulated according to the temperature control to be maintained in the polymerization vessel 1. Collected solvent in the accumulator 9 is pumped by the pump 11 through line 12 and the spray head 3 into the vessel 1. At this time valve 13 is open and valve 14 may be closed. The sprayed solvent will quickly and efficiently break-up any foam in the vapor space 15 and then be mixed into the solution 6 and help cool the polymerization.

As previously indicated, the foaming occurring during the polymerization lasts only while the rate of polymerization is relatively fast. During this period the solvent returning to the vessel 1 via the spray head 3 is easily mixed into the solution 6. With continued polymerization, the solution 6 becomes increasingly viscous and the less dense hydrocarbon solvent from the spray head 3 will not mix as readily and at that time it may be desirable to operate the system with valves 13 and 14 open so that foam breaking will occur in the vapor space 15 and at the same time the viscous solution 6 will be thinned by solvent entering from line 5. Ultimately, the rate of polymerization decreases to the point where foaming ceases to be a problem and then valve 13 can be closed and the condensed solvent is returned to the vessel 1 via line 5. When the polymerization is complete, the elastomer solution is ready for subsequent processing to recover the elastomer as a solid but such processes form no part of this invention.

An alternative procedure comprises alternating the return of the collected solvent through the spray head 3 and directly into the elastomer solution 6 while the solution is foaming or capable of foaming. Thus when there is a sufficient quantity of foam in the vapor space 15, the collected solvent is returned through the spray head 3 and when the foam is broken, valve 13 is closed and valve 14 is opened. When the foam again reaches a high enough level, valve 13 is open and valve 14 is closed. The cycle is repeated until the foaming is no longer troublesome at which time all the collected solvent may be returned into the elastomer solution through line 5 with valve 13 being closed. The determination of the degree of foaming for the purpose of control is most simply accomplished with a suitable viewing port (not shown) in the vessel 1. Alternatively the vessel 1 may be equipped with an electronic device which will provide a suitable signal. At the start of the process, it will be advantageous to have some solvent contained in the accumulator 9 and in that way any foam that forms in the vapor space 15 can be immediately broken even though the polymerization has not proceeded long enough to form a reserve of condensed solvent.

The processes of this invention, while being shown of batch operations, are equally suitable for continuous operations. In continuous operations, where the polymerization may be in multiple stages in a plurality of polymerization vessels, foaming may occur only in the first stage and only that stage need be equipped with a spray head. If necessary the subsequent stages may also be equipped with a similar spray head. The spray head 3 may be of any suitable design and construction. One form of spray head may be a nozzle that will supply sufficient force to break-up the foam. Alternatively, the spray head, or nozzle may be attached to a foam breaking spike which rotates and spatters the spray and thereby breaks the foam. The location of the spray head is not critical provided it is located in the upper portion of the vapor space 15. It will be seen that when the recirculating solvent is directed into the elastomer solution 6 below its liquid level, the pressure of the incoming solvent must be greater than the pressure head exerted by the elastomer solution. The specific pressure otherwise is not important and will depend on the size and capacity of the polymerization vessel. Accordingly, the pump 11 should be selected to provide sufficient pressure.

Before the polymerization begins, the solution 6 will comprise the monomer or monomers to be polymerized or copolymerized dissolved in a hydrocarbon solvent. Polymerization will begin almost immediately after the catalyst is introduced into the polymerizable solution. Thereafter, the solution 6 will contain monomer or monomers to be polymerized and the elastomer formed therefrom in varying proportions as the polymerization progresses. Accordingly, when reference is made to the "solution" or the "elastomer solution," it will be understood that these terms refer to solutions of variable compositions as described above. In any case, the solution 6 in the polymerization vessel 1 is a true solution throughout the polymerization and is free of solids of any kind except for small amounts of solid catalyst that may sometimes be employed.

The techniques and process steps that are concerned wholly with the choice of solvent, choice of ratios of monomer to catalyst, polymerization temperatures, method of charging the polymerization vessel, methods of recovering the elastomer and allied operations form no part of this invention. It is sufficient to note that such matters are fully described in the prior art and are briefly mentioned above and will be illustrated in more detail in the examples. It will be understood, however, that the present invention applies to the production of all synthetic elastomers wherein the polymerization of the monomer is carried out in solution and wherein the elastomer, as it forms, remains in solution irrespective of the solids content of the solution.

*Example I*

Polymerization of isoprene is carried out with apparatus shown in the drawing and described above. The polymerization vessel 1 is charged with commercial isopentane (95% isopentane and 5% n-pentane) and 2,080 pounds of isoprene so that the total charge constitutes about 16.6% by weight, of isoprene. Thereafter 0.4 pound of n-butyl lithium is added and with continuous agitation the polymerization begins. The polymerization vessel is closed to the atmosphere and the charging is accomplished with suitable fixtures to the vessel so that the several materials do not come in contact with the atmosphere. Prior to charging the polymerization vessel 1, the accumulator 9 is charged with about 100 gallons of commercial isopentane and maintained at about room temperature. After the addition of the catalyst the temperature of the monomer solution rises fairly rapidly due to an exotherm. The rising temperature is accompanied by the formation of excessive foam in the vapor space 15 of the polymerization vessel 1 and with the valve 14 closed and valve 13 opened, solvent from the accumulator 9 is pumped through the spray head 3 via line 12. The foam is quickly broken and the solvent causes a reduction in the temperature in the polymerization vessel. When the foam is broken, the pump 11 is stopped and the polymerization continues with agitation. When the foam builds up again, the pump 13 is started again and again the foam is broken by the incoming solvent through the spray head 3. The cycle is repeated as often as the foam builds up. During this time, solvent in the solution 6 is evaporating and the vapors pass in line 7 and are condensed by the condenser 8 and then accumulated in the accumulator 9. The evaporation of the solvent from the solution 6 is affected by the exotherm which raises the temperature of the solution and the solution temperature is maintained at about 55–65° C. by the evaporating solvent. The spray of solvent from the spray head 3 is for a period of time which is at least long enough to break the foam but in actual practice it is usually somewhat longer in order to help keep the polymerizing solution within the desired temperature range and to reduce the viscosity of the solution 6. As the polymerization continues the solution 6 becomes increasingly viscous and a point is reached when the viscosity of the solution is so high that the incoming solvent from the spray head 3 does not readily blend into the solution 6. At that time valve 14 is opened also so that solvent enters below the liquid level of the solution. If no further foaming occurs valve 13 is closed and the returning solvent is recirculated exclusively into the solution 6 below the liquid level. In this example, foaming stopped after about 30 minutes. The total polymerization time was about 5 hours and the average pressure developed in the reactor was about 18 p.s.i.g. A withdrawn sample of the elastomer solution at the end of the 5 hour polymerization period contained about 92% of cis-1,4-polyisoprene and had an intrinsic viscosity of 7.4 dl./gm. measured in toluene at 25° C. The solid content was about 16% by weight. Thereafter the elastomer solution was treated to recover the solid by feeding the solution into the vessel containing hot water whereupon the elastomers coagulated as a solid crumb which was recovered.

*Example II*

The procedures of Example I requires much attention for intermittent recirculation of solvent through the spray head. Accordingly, the procedure is repeated except that the spray head 3 is maintained in continuous operation until the rate of polymerization decreases sufficiently so that no foaming occurs. For such a procedure, care should be taken not to pump the solvent faster than it is condensed and accumulated and for this reason the pump 11 is advantageously a variable displacement pump and the accumulator should be equipped with a suitable indicator to show the quantity of solvent available. As in the above example a short interval is reached prior to the end of the foaming period when it is desirable to recycle the solvent through the spray head 3 and below the liquid level of the solution 6. In this example the solvent was recirculated at a maximum rate of four gallons per minute.

The same consideration and procedures described above apply equally to the production of elastomeric copolymers of ethylene and propylene. This is the case irrespective of the proportions of the respective monomers used in preparing the copolymer.

*Example III*

The procedure of Example II is repeated in similar apparatus except on a smaller scale. The polymerization vessel in this case is 5 liters and to it is charged one liter of dry, oxygen-free hexane and one millimole of triisobutyl aluminum. Thereafter, the hexane is saturated with a mixture of ethylene and propylene by bubbling a mixture of the gases through the hexane. The mixed gases are in a mole ratio of ethylene to propylene of 1:2.5. Thereafter 0.3 millimole of vanadium tetrachloride is added and the polymerization starts soon thereafter. The various components are charged with constant agitation under conditions that prevent contact with the atmosphere. The polymerization is accompanied by foaming and the evolution of heat. When the foaming begins, hexane solvent is recirculated through a small spray head located in the vapor space of the polymerization vessel. The polymerization temperature is maintained in this way at about 50° C. In this example foaming occurs for about 10 minutes and after that time the rate of polymerization decreases sufficiently so that further foaming does not occur. By that time, additionally, the elastomer solution is quite viscous so that the continued recirculation of the hexane is wholly into the elastomer solution below its liquid level through an inlet in the lower part of the 5 liter polymerization vessel. After about 30 minutes the polymerization is terminated and a withdrawn sample of the elastomer solution, upon recovery of the solid copolymer, is found to contain about 50% of polymerized ethylene. The copolymer is amorphous and on stretching it crystallizes.

*Example IV*

The procedures of Example III are repeated except that the ethylene:propylene ratio is varied by adjusting valves on the respective feed tank so that the mole ratio of ethylene to propylene is 1.4:1. The resulting copolymer is found to contain 77% of polymerized ethylene.

In the production of the cis-1,4-addition product of polybutadiene, which is also a synthetic elastomer, the solvent normally has a higher boiling point and preferably is benzene or a mixture of benzene and aliphatics solvent. Because of the higher boiling point some modifications may be required, depending upon the polymerization conditions, in order to achieve suitable reflux cooling. This may be conveniently accomplished by conducting the polymerization at reduced pressures and thereby facilitating removal of solvent vapors.

*Example V*

A saturated solution of butadiene in benezene is polymerized with a catalyst that is the reaction product of cobalt chloride and triisobutyl aluminum in a mole ratio of 2:5:1. Because of the higher boiling point of the solvent, cooling by evaporation does not take place readily at a preferred polymerization temperature of about 50° C. Accordingly, the polymerization vessel during the polymerization is under reduced pressure thereby causing evaporation of the solvent. Because of the reduced pressures butadiene is also evaporated and the mixture of vapors is taken off overhead but only the solvent is condensed, accumulated and recirculated into the vapor space of the polymerization vessel while the butadiene remains dissolved therein. The polymerization initially is accompanied by foaming and because of the reduced pressures the composition of the collected vapors is constantly changing thereby requiring variations in the pressure during the course of the polymerization. In most cases, the pressure need not be less than about 140 mm. Hg. When the rate of reaction decreases sufficiently, the foaming ceases and the exotherm is not as high. Accordingly, the pressure may then be increased and the temperature of the polymerizing may be allowed to increase. The elastomer solution generally is not as viscous as in the previous examples and recirculation of the solvent, which contains dissolved butadiene, need not be below the liquid level of the solvent for some time after the foaming ceases. The elastomer which is ultimately recovered has a cis-1,4-content of about 97.0% and an intrinsic viscosity of about 7.4 dl./gm. measured in toluene at 25° C.

Because of the higher boiling point of benzene in Example V, the ultimate recovery of the elastomer is more costly as more heat is required to separate the elastomer from the benzene. Increased costs also exist because of the reduced pressure required for evaporative cooling. Finally, the recovered polymer has a wider distribution of molecular weight because of the varying butadiene concentration in the polymerizing solution. These disadvantages are largely overcome by using a solvent that contains a substantial portion of a lower boiling solvent.

Example VI

Butadiene is polymerized in the same apparatus as in Example III except that the solvent is a mixture of 50 parts of benzene and 50 parts of isobutane, by weight. The polymerization is carried out at about atmospheric pressure and in this case the rising temperature causes the isobutane to evaporate. The benzene does not evaporate and only small amounts of butadiene are carried overhead. The recirculating solvent which breaks the foam and cools the polymerizing solution is condensed isobutane which contains small amounts of dissolved butadiene. The polymerization temperature is maintained at the desired 50–60° C. by adjusting the amount of recirculating solvent and after the foaming ceases and the elastomer solution becomes quite viscous the isobutane is recirculated into the elastomer solution below its liquid level. The elastomer is recovered more economically and has a narrower molecular weight distribution. It has a high cis-1,4-content, as in Example V and has a lower I.V.

The present invention will be seen to be capable of numerous modifications as in the choice of apparatus used to recover and recirculate evaporating solvent. Another feature that may require modification is the rate of recirculation of the solvent into the reactor. The rate depends a great deal on the capacity of the reactor, the design of the spray head, the pressure of the solvent being recirculated, the extent of foaming which is influenced by several factors affecting the rate of polymerization, and similar considerations. Further the rate may be variable particularly at the early stages of the polymerization and may range from as little as 0.5 gal./min. to as much as 20 gal./min. In other cases, still greater recirculation rates may be required. Additional modifications may be made in the polymerization process, particularly in the choice of catalysts, solvents, relative proportions of the reactants and the like. Such matters, including the production of other synthetic elastomers, form no part of this invention.

We claim as our invention:

1. In the process for producing synthetic elastomers from hydrocarbon solutions thereof, the elastomer being selected from the group consisting of cis-1,4-polybutadiene, cis-1,4-polyisoprene and ethylene-propylene copolymer, the said process being by polymerization in a polymerization vessel at temperatures ranging 25 to 100° C., the polymerization being accompanied by the generation and accumulation of foam and the elastomer being in solution throughout the polymerization, the improvement comprising condensing and accumulating evaporating solvent, thereafter alternating between (1) spraying a portion of the accumulated solvent into the vapor space of the polymerization vessel, the spray coming in direct contact with the foam, and (2) recirculating accumulated solvent into the elastomer solution below the liquid level of the elastomer solution.

2. The process of claim 1 wherein the synthetic elastomer comprises the 1,4-addition product of isoprene.

3. The process of claim 1 wherein the synthetic elastomer comprises the 1,4-addition product of butadiene.

4. The process of claim 1 wherein the synthetic elastomer is the copolymer of ethylene and propylene.

References Cited in the file of this patent

UNITED STATES PATENTS

| | | |
|---|---|---|
| 2,158,425 | Ragatz | May 16, 1939 |
| 2,475,628 | McSweeney | July 12, 1949 |
| 2,484,384 | Levine et al. | Oct. 11, 1949 |
| 2,545,144 | Green et al. | Mar. 13, 1951 |